(12) United States Patent
Hirayama

(10) Patent No.: US 6,474,580 B1
(45) Date of Patent: Nov. 5, 2002

(54) DUAL-BEARING REEL CENTRIFUGAL BRAKING DEVICE

(75) Inventor: Hirokazu Hirayama, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 09/631,705

(22) Filed: Aug. 3, 2000

(30) Foreign Application Priority Data

Aug. 4, 1999 (JP) ........................................... 11-220823

(51) Int. Cl.[7] ............................................. A01K 89/02
(52) U.S. Cl. ................................... 242/289; 188/181 A
(58) Field of Search ................................. 242/288, 289; 188/181 A, 185

(56) References Cited

U.S. PATENT DOCUMENTS

| | | | | |
|---|---|---|---|---|
| 5,356,090 A | * | 10/1994 | Sato | 242/289 |
| 5,372,324 A | * | 12/1994 | Sato | 242/289 |
| 5,393,005 A | * | 2/1995 | Nakajima | 242/289 |
| 5,782,420 A | * | 7/1998 | Forslund et al. | 242/289 |
| 5,803,385 A | * | 9/1998 | Baisch | 242/289 |
| 5,865,387 A | * | 2/1999 | Hirano | 242/289 |
| 5,984,221 A | * | 11/1999 | Kim | 242/289 |
| 6,003,798 A | * | 12/1999 | Kim | 242/289 |
| 6,168,106 B1 | * | 1/2001 | Cockerham | 242/289 |
| 6,254,021 B1 | * | 7/2001 | Morimoto et al. | 242/289 |

* cited by examiner

*Primary Examiner*—Emmanuel M. Marcelo
(74) *Attorney, Agent, or Firm*—Shinjyu Global IP Counselors, LLP

(57) ABSTRACT

Dual-bearing reel centrifugal braking mechanism in which rapid adjustment of braking force is enabled. The centrifugal braking mechanism includes a plurality of shifters, a cylindrical brake element, a switching mechanism, and an identification mark. The shifters are allowed to shift diametrically fitted radially onto a rotor. The brake element, furnished in the reel unit to be non-rotatable with respect thereto, is disposed outer-peripheral endwise of the shifters, wherein the shifters can shift into contact with the brake element. By translating the shifters into different diametrical positions, the switching mechanism enables switching between an operative state wherein the shifters can come into contact with the brake element, and an inoperative state wherein the shifters cannot. The identification mark is for discriminating shifters switched into the operative state from shifters switched into the inoperative state.

21 Claims, 11 Drawing Sheets

DUAL-BEARING REEL CENTRIFUGAL BRAKING DEVICE

BACKGROUND OF THE INVENTION

1. Technical Field

The present invention relates to reel-braking devices; in particular to dual-bearing reel centrifugal braking devices for braking under centrifugal force the spool rotatively provided in the reel unit.

2. Description of Related Art

In dual-bearing reels referred to as a bait reels, utilized mainly for lure fishing, generally braking force is made to act on the spool so that backlash, wherein the rotational speed of the spool when casting is faster than the line wind-out speed, does not occur. Centrifugal braking devices that employ centrifugal force developing from spool rotation to brake the spool are an example of this type of braking mechanism.

Centrifugal braking mechanisms of this class are provided with: a plurality of shifters that are disposed radially on a rotor that rotates linked with the spool and that are allowed to shift in the diametric direction of the spool; and a cylindrical brake element disposed to the outer peripheral side of the shifters. The centrifugal braking mechanism disclosed in Japanese utility Model Gazette Reg. No.5 - 73 switches the shifters respectively between an operative state for contact with the brake element and an inoperative state in which the shifters cannot come into contact with the brake element. In the centrifugal braking device disclosed in the aforementioned publication, a plurality of housings for accommodating the shifters is formed in radial fashion in the rotor, a guide shaft is stood radially in each of the housings, and the shifters are fitted to and allowed to slide on the guide shafts.

Pairs of fixing projections elastically deformable heading inward are formed on lateral walls of the housings, and elastically deformable shifter projections and that interlock with the fixing projections are formed on the shifters. Then, pushing the shifters depth-ward into the recesses (diametrically inward) so that they ride past the fixing projections and are put into the inoperative state makes the fixing projections restrict diametrical travel of the shifters so that they cannot come into contact with the brake element.

In the foregoing conventional braking device, shifters in the inoperative state beyond the fixing projections, and shifters in the operative state diametrically outward from the fixing projections are disposed sandwiching and in close proximity to the fixing projections. For this reason, without taking a close, scrutinizing look at the shifters, the shifters in the operative state cannot be told apart from the shifters in the inoperative state—the state of the shifters can not be determined easily. Not being able readily to determine the state of the shifters makes adjusting braking force require a lengthy amount of time, such that the braking force cannot be adjusted rapidly.

SUMMARY OF THE INVENTION

An object of the present invention is to enable braking force to be adjusted rapidly in a dual-bearing reel centrifugal braking device in which the shifters are switchable between the two states.

A dual-bearing reel centrifugal braking device according to one aspect of the present invention is for braking under centrifugal force the spool rotatively fitted in the reel unit. The centrifugal braking device includes a brake element, a plurality of shifters, a switching means, and a discrimination means. The brake element is a component attached to be non-rotatable with respect to the reel unit. The shifters are attached as a plurality to the spool, or to a rotor coupled for rotation with the spool, wherein they are allowed to shift into contact with the brake element; their pressure of contact against the brake element increases in response to increasing centrifugal force. The switching means is for switching at least any one shifter among the plurality between an inoperative state in which they cannot come into contact with the brake element, and an operative state in which they can. The discrimination means is for discriminating between shifters in the inoperative state and shifters in the operative state.

Switching switchable shifters among the plurality of shifters in this centrifugal braking device to the inoperative state from the operative state puts those shifters switched to the inoperative state out of contact with the brake element, making the braking force that much weaker. Shifters in the inoperative state can be told apart from shifters in the operative state by the discrimination means. The two states of the shifters can therefore be easily determined, enabling rapid adjustment of the braking force.

In another aspect, the dual-bearing reel centrifugal braking device is as in the foregoing, but in particular wherein: the plurality of shifters is fitted radially to the spool or the rotor allowing them to shift diametrically; and the brake element is a cylindrical component disposed to the outer peripheral side of the plurality of shifters. Accordingly, the shifters of the radially arranged plurality travel towards the brake element when the spool rotates, coming into contact with the brake element with pressure-contact force corresponding to the centrifugal force. Herein, since the shifters move in the direction in which the centrifugal force acts, the centrifugal force is exploited efficiently for braking force.

The centrifugal braking device in another aspect of the present invention is a device as just described, yet in particular wherein the switching means is enabled to switch between the inoperative state and the operative state by translating the shifters into different diametrical positions. Accordingly, switching between the two states is by translating the shifters in the same direction as the direction in which they shift, which therefore reduces the amount of movement when switching and facilitates the switching operation.

In yet a further aspect, the dual-bearing reel centrifugal braking device is that as just described, but further wherein the switching means includes: fixing projections formed on the spool or rotor and projecting towards the shifters; and shifter projections formed on the shifters, from which they project for interlocking with the fixing projections. At least the set of fixing projections or the set of shifter projections therein is elastically deformable. Accordingly, the shifters may be easily switched between the two states by elastically deforming projections of at least the one set among the two sets of projections.

The dual-bearing reel centrifugal braking device a according to still a further aspect of the present invention is a device as aforementioned, and furthermore wherein the fixing projections are formed on the spool or rotor projecting circumferentially to sandwich the shifters. Accordingly, disposing the fixing projections to sandwich the shifters maintains the shifters securely in the inoperative state.

In another aspect, the centrifugal braking device is as set forth above, but additionally wherein the spool or the rotor further comprises stop projections arranged in a row diametrically outward of the fixing projections for interlocking with the shifter projections. Accordingly, the shifters do not get out of place even when the spool is taken out of the reel unit.

The dual-bearing reel centrifugal braking device according to still another aspect of the present invention is device as in foregoing aspects, furthermore wherein the discrimination means is an identification mark formed annularly in a position visually observable on a lateral face of said rotary member outward along the rotary shaft of the spool from the rotary member, concentric with the rotational axis. Accordingly, since the identification mark is formed concentric with the rotational axis, the two states can be readily told apart by comparing the positions of the two states—whose positions differ diametrically from the rotational axis—and of the identification mark.

In a further aspect, the centrifugal braking device is as just mentioned, yet further wherein the identification mark is formed annularly in a diametrical position wherein when visually observed outward along the rotary shaft it is shielded by said shifters switched into the inoperative state by said switching means, and is not shielded by said shifters switched into the operative state. Accordingly, the two states may be more easily told apart depending on whether the identification mark can be seen or not.

The dual-bearing reel centrifugal braking device in another aspect of the present invention is a device as set forth in earlier described aspects, and furthermore wherein by translating the shifters into different rotational positions about their axes of diametrical shift, the switching means is enabled to switch between the inoperative state and the operative state. Accordingly, the shifters are switched between the two states by rotating them in a direction that differs from their shifting direction, which increases the amount by which the shifters travel when switching. Therefore, the states are distinguishable from the shifting direction of the shifters, enabling the switching means to serve dually as a discrimination means. Furthermore, since switching between the states is by rotating the shifters, arranging colors or patterns that differ in the rotational direction on the shifters themselves enables the states to be told apart.

In yet a further aspect, the centrifugal braking device is as set forth in the foregoing, yet moreover wherein: the plurality of shifters is fitted to the spool or the rotor for pivoting about a plurality of axes along chord directions in rotational arcs of the spool; and the switching means is enabled to switch between the inoperative state and the operative state by translating the shifters into different pivotal positions about their axes along the chord directions. Accordingly, varying the pivotal positions of the pivoting shifters puts them into the two states, and therefore the two states may be discriminated by the pivotal angle of the shifters. At the same time, arranging colors or patterns on the shifters or the rotor makes the discrimination easier.

From the following detailed description in conjunction with the accompanying drawings, the foregoing and other objects, features, aspects and advantages of the present invention will become readily apparent to those skilled in the art.

DETAILED DESCRIPTION OF THE PREFERRED EMBODIMENTS

Overall Configuration

Figure 1:
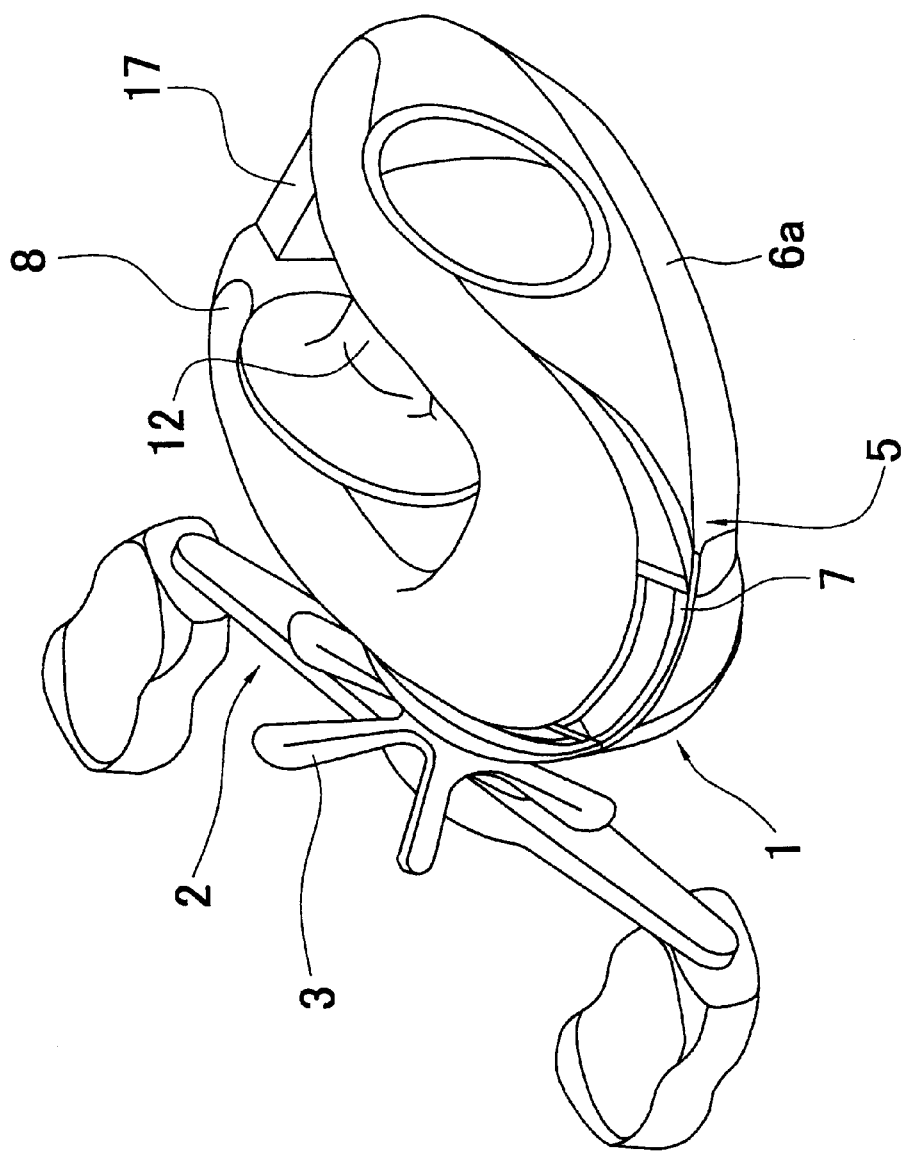
FIG. 1 is an oblique view of a dual-bearing reel in which an embodiment of the present invention is applied.

A dual-bearing reel according to an embodiment of the present invention is the low-profile type bait-casting reel as in FIG. 1. The reel shown in the figure includes a reel unit 1, a handle 2, and a star drag 3 for adjusting drag. The handle 2 is provided for rotating the spool and is disposed on one side of the reel unit 1. The star drag 3 is disposed on the reel unit 1 side of the handle 2.

Figure 2:
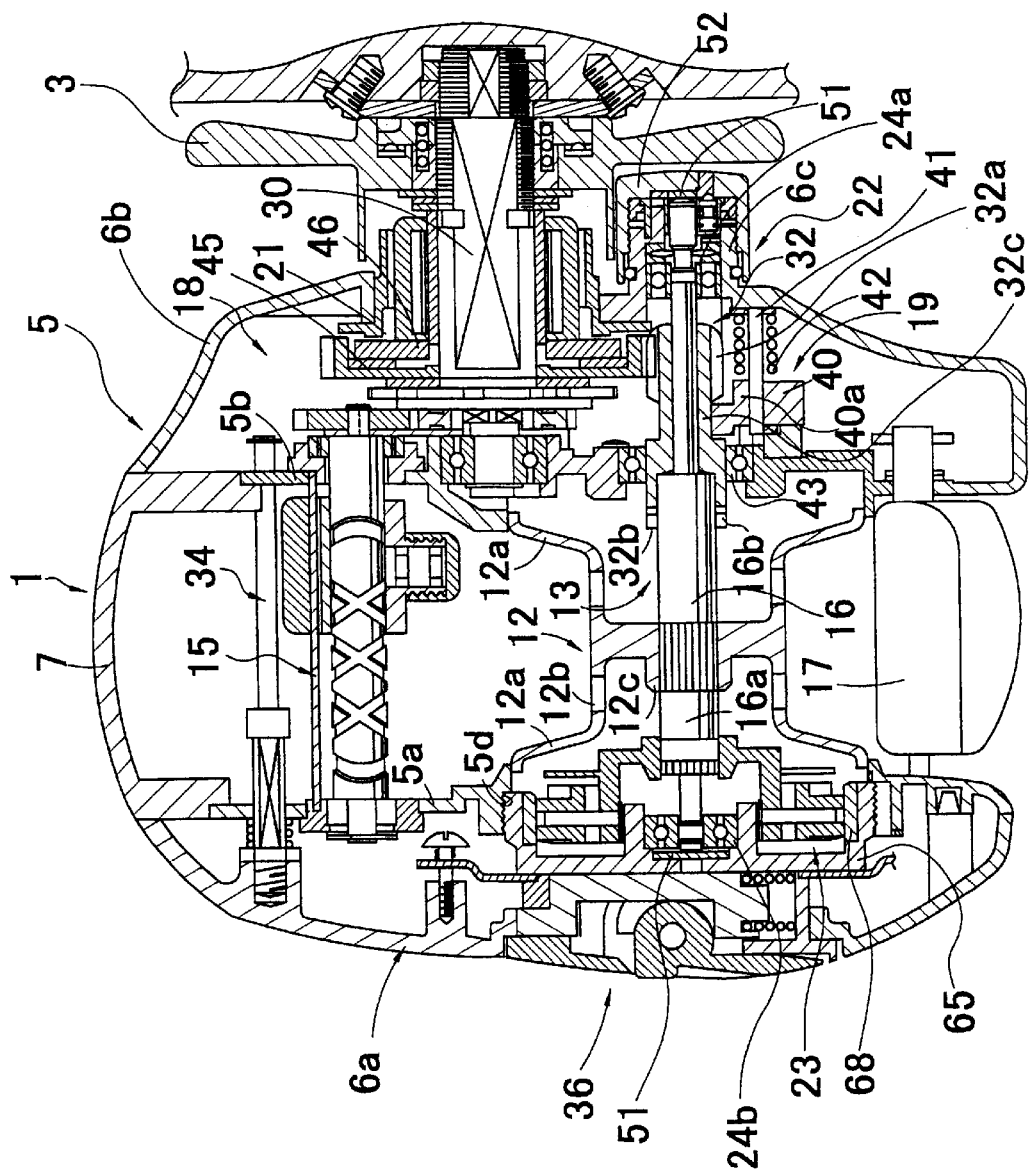
FIG. 2 is a horizontal sectional view through the reel depicted in FIG. 1.

As shown in FIG. 2, the reel unit 1 includes a frame 5, a first side-cover 6a, and a second side-cover 6b. The first side-cover 6a and the second side-cover 6b are disposed on respective sides of the frame 5. Also, the reel unit 1 includes, as shown in FIG. 1, a front cover 7 that covers the front end and a thumb rest 8 that covers the top. A spool 12 onto which fishing line is wound is rotatively and detachably provided in the reel unit 1.

The frame 5 includes a pair of side plates 5a and 5b, disposed opposing each other at a predetermined spacing, and a plurality of connecting members (not shown), interconnecting the side plates 5a and 5b.

Figure 3:
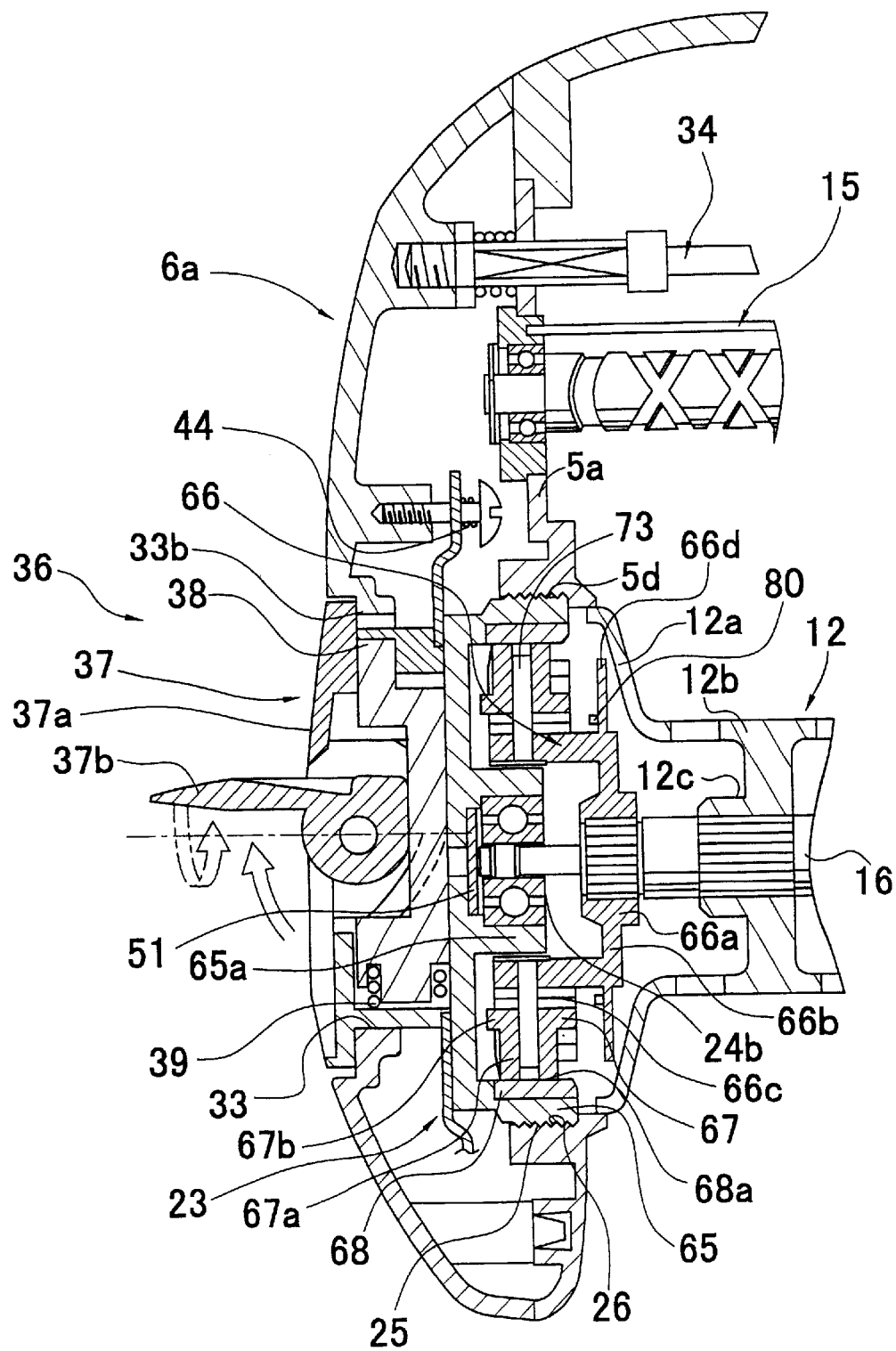
FIG. 3 is a partial view corresponding to the FIG. 2 sectional view, enlarged to illustrate a centrifugal braking mechanism according to the present invention.

The first side-cover 6a is pivotally attached to the frame 5 for opening off of and closing onto the frame 5 to attach/detach the spool 12. As shown in FIG. 2, the first side-cover 6a includes a pivoting mechanism 34 and a locking mechanism 36 for an opening/closing operation. The pivoting mechanism 34 pivotally supports the first side-cover 6a at a front portion of the frame 5, to be movable away from the frame. The locking mechanism 36 is for locking and unlocking the first side-cover 6a into its closed state. As shown in FIG. 3, the locking mechanism 36 includes an handle 37 which is attached to an opening 33 formed on the first side-cover 6a and a locking member 38 attached to the handle 37 to be movable manner back and forth. The handle 37 includes a handle body 37a rotatably and axially movably attached to the opening 33, and a control lever 37b fitted to be pivotal about a diametric shaft in the handle body 37a.

The handle body 37a, a substantially cylindrical component, is urged by a coil spring 44 in a direction nearing the first side-cover 6a. A cylindrical brake case 65 having a base, part of a later described centrifugal braking mechanism, is fixed to the handle body 37a by a screw. The brake case 65 is detachably attached by means of a screw structure to an opening 5d formed in the side plate 5a for attaching/detaching the spool.

The screw structure includes a male threads 25 formed on the outer peripheral surface of the brake case 65 and female threads 26 formed in the inner peripheral surface of the opening 5d and engaged with the male threads 25.

Figure 5:
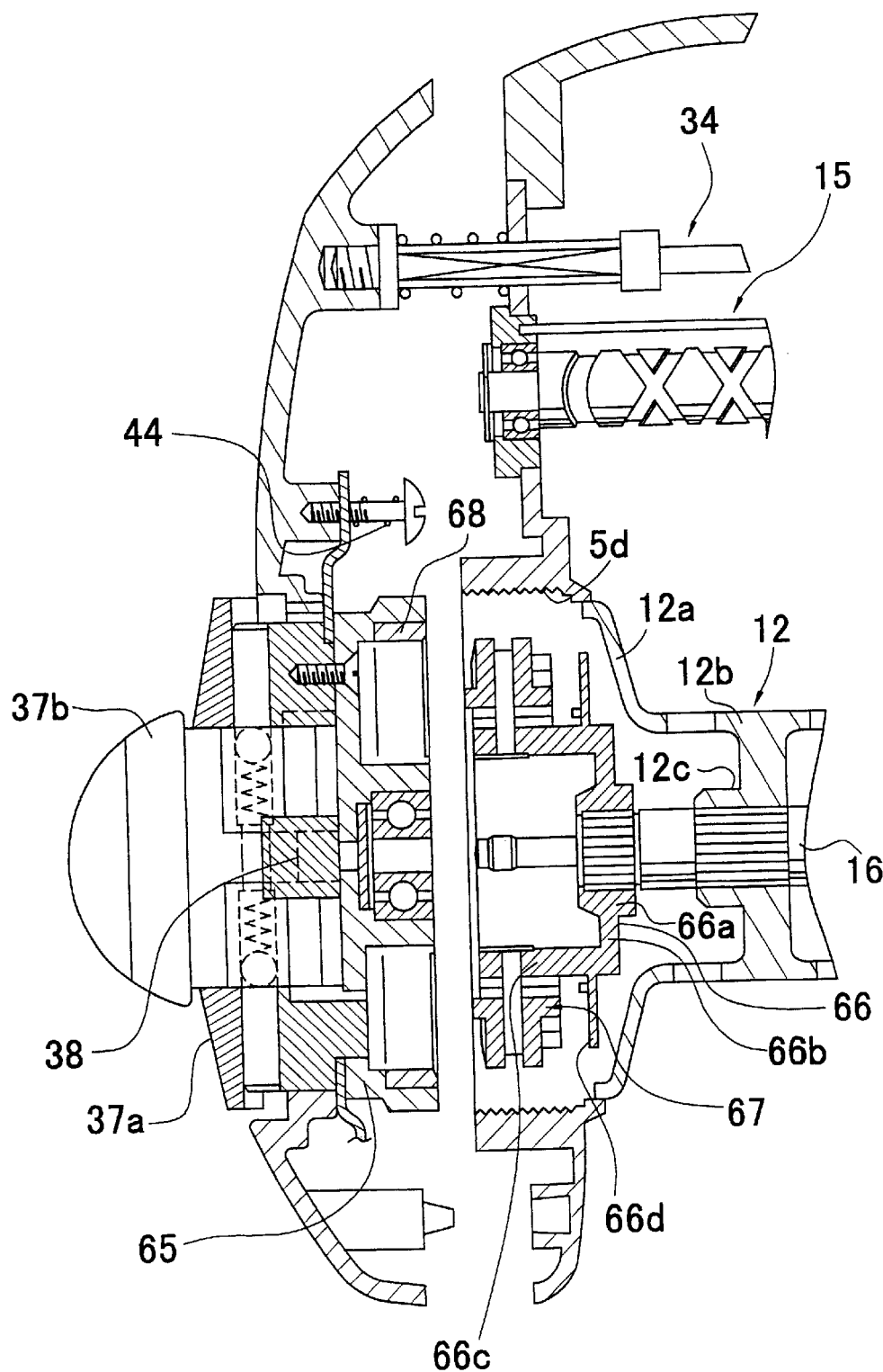
FIG. 5 is a view corresponding to FIG. 3, but wherein the first side-cover has been turned off the reel unit.

The control lever 37b is provided for pivoting between a locked state in which it is housed into the handle body 37a, as shown in FIG. 2, and a unlocked state in which it projects from the handle body 37a, as shown in FIG. 5. A portion of the control lever 37b engages with the locking member 38.

The locking member 38 is for locking rotation of the handle body 37a to keep the first side-cover 6a when closed from opening. When the locking member 38 is advanced to the locking position shown in FIG. 2, the tip is engagable with whichever of a plurality of recesses 33b formed circumferential spaced in the opening 33. When the locking member 38 is drawn into the lock-releasing position shown in FIG. 5, engagement with the recess 33b is released, making the handle body 37a rotatable. The locking member 38 is urged advancing-ward by a coil spring 39 fitted to the handle body 37a.

As shown in FIG. 2, the spool 12, which is disposed in orthogonal to the fishing rod, a level wind mechanism 15, and a clutch lever 17 are disposed inside the frame 5. The level wind mechanism 15 is provided for uniformly winding fishing line around the spool 12. The clutch lever 17 functions as a thumb rest when pitching. A gear mechanism 18, a clutch mechanism 13, a clutch switching mechanism 19, a drag mechanism 21, and a casting control mechanism 22 are disposed in the space between the frame 5 and the second side-cover 6b. The gear mechanism 18 transmits rotational force from the handle 2 to the spool 12 and the level wind mechanism 15. The clutch switching mechanism 19 switches the clutch mechanism 13 in accordance with the operation of the clutch lever 17. The casting control mechanism 22 adjusts resistance developing when the spool 12 rotates. Also, a centrifugal braking mechanism 23 which prevents backlash when casting fishing line, is disposed between the frame 5 and the first side-cover 6a.

At either end of the spool 12 are flange portions 12a each of which is disk-shaped, and a cylindrical spool body 12b is provided between the flange portions 12a. Also, the spool 12 has a cylindrical boss portion 12c that is formed integrally with the spool body 12b in a substantially central position of the spool body 12b in the axial direction. The spool 12 may be fixed to the spool shaft 16 that penetrates the boss portion 12c, in a non-rotatable manner by, for instance, serration engagement. The fixing method is not limited to serration engagement, and various methods such as a key engagement or a spline engagement may be employed. The spool 12 may penetrate the opening 5d on the side plate 5a.

The spool shaft 16 penetrates through the side plate 5b and extends outside the second side-cover 6b. The extended end of the spool shaft 16 is rotatably supported by a bearing 24a of a boss portion 6c which is provided with the second side-cover 6b. Also, a bearing 24b in the centrifugal braking mechanism 23 rotatably supports the other end of the spool shaft 16. The bearings 24a and 24b are shield ball bearings.

The right end of a large diameter portion 16a of the spool shaft 16 is disposed at the penetration portion of the side plate 5b and an engaging pin 16b which forms a part of the clutch mechanism 13 is fixed thereto. The engaging pin 16b penetrates the large diameter portion 16a along the diameter direction and both ends thereof project diametrically.

The gear mechanism 18 includes a handle shaft 30, a main gear 31, and a pinion gear 32. The main gear 31 is coupled to a handle shaft 30. The pinion gear 32 has a cylindrical shape and is engaged with the main gear 31. The position of the handle shaft 3 of the gear mechanism 18 is lower than a conventional position in order to lower the height of the thumb rest 8. For this reason, the lower portion of the side plate 5b and that of the second side-cover 6b for accommodating the gear mechanism 18 are positioned lower than the lower portion of the side plate 5a and that of the first side-cover 6a.

As shown in FIG. 2, the pinion gear 32 is a cylindrical member that extends from outside of the side plate 5b to inside thereof and the spool shaft 16 penetrates the center portion thereof. The pinion gear 32 is coupled to the spool shaft 16 in a movable manner in the axial direction. The left end portion (in FIG. 2) of the pinion gear 32 is rotatably supported by a bearing 43 with respect to the side plate 5b in a movable manner in the axial direction. The bearing 43 is also a shield ball bearing.

The pinion gear 32 includes a toothed portion 32a, an engaging portion 32b and a constricted portion 32c. The toothed portion 32a is formed on a right-hand side outer periphery portion in FIG. 2 and engaged with the main gear 31. The engaging portion 32b is formed at the other side. The constricted portion 32c is disposed between the teeth portion 32a and the engaging portion 32b. The engaging portion 32b includes a channel formed on an end surface of the pinion gear 32 in the diameter direction and an engaging pin 16b which penetrates the spool shaft 16 and fixed is engaged therewith. In this embodiment, when the engaging portion 32b is disengaged from the engaging pin 16b of the spool shaft 16 as the pinion gear 32 moves outwardly, the rotational force of the handle shaft 30 is not transmitted to the spool 12. The engaging portion 32b and the engaging pin 16b constitute the clutch mechanism 13. When the engaging pin 16b is engaged with the engaging portion 32b, twisted deformation is reduced and a torque transmission efficiency is increased since the torque is directly transmitted to the spool shaft 16 from the pinion gear 32 having a larger diameter than the spool shaft 16.

As shown in FIG. 2, the clutch lever 17 is disposed at the back of the spool 12 between the pair of the side plates 5a and 5b.

The clutch switching mechanism 19 includes a clutch yoke 40 as shown in FIG. 2. The clutch switching mechanism 19 is disposed at outer peripheral side of the spool shaft 16 and supported by two pins 41 (only one in shown in the figure) in a movable manner parallel to the axial center of the spool shaft 16. Also, the clutch yoke 40 includes an engaging portion 40a that engages with the compressed portion 32c of the pinion gear 32 at the center portion thereof. Moreover a spring 42 is disposed at an outer periphery of each of the pins 41 for supporting the clutch yoke 40 between the clutch yoke 40 and the second side-cover 6b. The clutch yoke 40 is always urged towards inside by the spring 42.

In this configuration, the pinion gear 32 is located at an inner clutch engaging position in a normal state so that the engaging portion 32b is engaged with the engaging pin 16b of the spool shaft 16 to be a clutch-on state. On the other hand, when the pinion gear 32 is moved outwardly by the clutch yoke 40, the engaging portion 32b is disengaged from the engaging pin 16b to be a clutch-off state.

The drag mechanism 21 includes a drag washer 45 and a pressing plate 46. The main gear 31 presses on the drag washer 45. The pressing plate 46 presses the drag washer 45 against the main gear 31 with a predetermined force by a rotational operation of the star drag 3.

The casting control mechanism 22 includes a plurality of drag washers 51 and a braking cap 52. The plurality of drag washers 51 is disposed so as to hold both ends of the spool shaft 16. The braking cap 52 adjusts a holding force of the drag washers 51 holding the spool shaft 16. The drag washer 51 at the left-hand side is disposed in the brake case 65.

Centrifugal Braking Mechanism Configuration

As shown in FIGS. 3 and 5, the centrifugal braking mechanism 23 includes a brake element 68, a rotor 66, and a plurality (for instance, six) of shifters 67. The brake element 68 is fixed to the brake case 65. The rotor 66 is disposed to the inner peripheral side of the brake element 68 so as to be concentric with the brake element and fixed to the spool shaft 16. The shifters 67 are attached to the rotor 66 in a movable manner in the radius direction.

The brake element 68 is a thin cylindrical member made of, for instance, copper alloy and fixed to an inner periphery surface of the brake case 65. The brake element 68 has a braking surface 68a of a cylindrical shape at the inner periphery surface thereof. The brake case 65 is a short cylindrical member having a bottom and a bearing accommodating portion 65a of a cylindrical shape which projects inwardly is formed on the inner bottom surface thereof. The bearing 24b for supporting the spool 16 is disposed at the inner peripheral side of the bearing accommodating portion 65a and the drag washer 51 of the casting control mechanism 22 is attached thereto.

Figure 4:
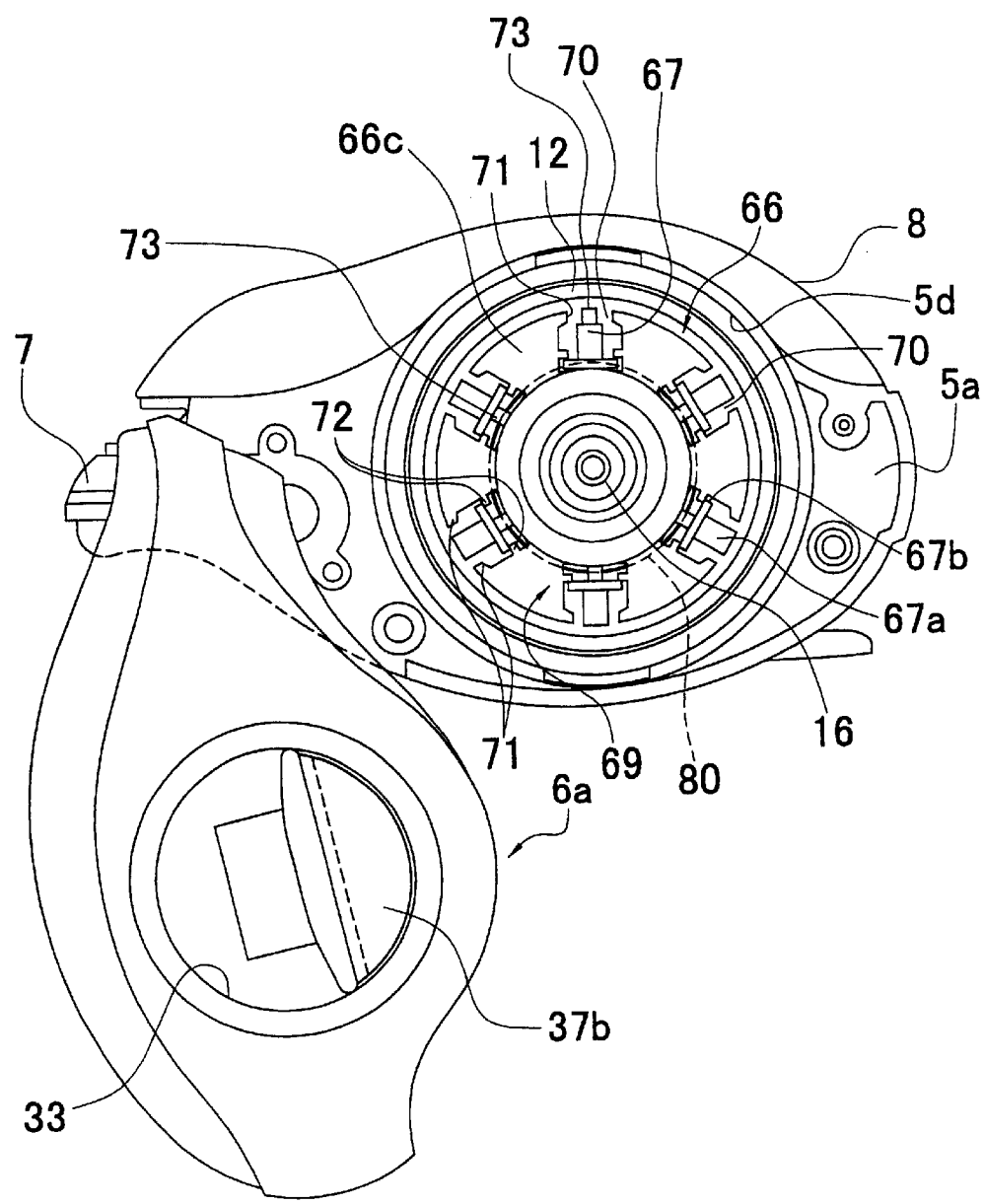
FIG. 4 is a lateral view of the reel wherein a first side-cover has been turned off the reel unit, seen from the left side in FIGS. 2 and 3.

The rotor 66 includes a fixing portion 66a, a body 66b, and a circular plate portion 66c of a thick ring shape. The fixing portion 66a is fixed to the spool shaft 16. The body 66b extends to an outer peripheral side of the bearing accommodating portion 65a from the fixing portion 66a. The circular plate portion 66c projects outwardly in the radius direction from the outer periphery surface of an extended end of the body 66b. A circular plate wall portion 66d is provided with the spool 12 side of the body 66b opposing to the circular plate portion 66c. A annular identification mark 80 is formed axially concentric the spool shaft to the inner peripheral side of the circular plate wall portion 66d. The identification mark 80 is formed at a position where it is intercepted by the shifters 67 when the shifters 67 are in their inoperative state (to be described later) and where it can be confirmed by visual inspection when the shifters 67 are in their operative state. Details of a more concrete position of the identification mark 80 will be As shown in FIG. 4, for instance, six, guiding recesses 70 are formed at the outer periphery portion of the circular plate portion 66c with an equal space between each other in the circumferential direction. The guiding recesses 70 accommodate the shifters 67 and switch the state of the shifters 67 to the operative state in which they may make contact with the brake element 68 or to the inoperative state in which they cannot make contact with the brake element 68. Diametrically spaced pairs of projections 71 and 72 for restricting the movement of the shifter 67 are disposed on opposing wall surfaces. Also, a guide shaft 73 for guiding the respective shifter 67 is disposed at the bottom of the respective guiding recess 70 radially in the radius direction.

The projections 71 are formed at an opening end of the guiding recess 70 and prevent the respective shifter 67 from falling off the guide shaft 73. The projections 72 are formed at positions close to the bottom surface of the guiding recess 70 so that the shifters 67 do not make contact with the brake element 68.

The shifters 67 are members of substantially a cylindrical shape made of a synthetic resin. The shifters 67 are attached to the guide shafts 73 in a slidable manner in the radius direction and make contact with the brake element 68 by a centrifugal force generated by the rotation of the spool 12. Each of the shifters 67 includes a main portion 67a of a cylindrical shape and a collar portion 67b. The main portion 67a is guided by the guide shaft 73. The collar portion 67b is integrally formed with the main portion 67a at an inner end portion thereof. The collar portion 67b projects outwardly from the inner end portion of the main portion 67a so that it may be engaged with the pair of the projections 71 and 72. The switching mechanism 69 is formed by the collar portion 67b and the projections 72.

When the collar portion 67b is placed between the projections 71 and 72, it is engaged with the projection 71 and the shifter 67 is prevented from falling off. However, it may contact with the brake element 68 and this state is called the operative state. Also, when it is placed more interior in the radius direction than the projection 72 by being pushed in the radius direction, the shifter 67 is engaged with the projection 72 and cannot make contact with the brake element 68. This state is called the inoperative state. As mentioned above, by switching the state of the shifter 67 to the operative state or the inoperative state, the number of the shifters 67 which may contact with the brake element may be adjusted. In this embodiment, when the shifters 67 are switched to the inoperative state, the identification mark 80 is hardly seen from outside of the reel since it is covered by the collar portion 67b of the shifter 67. That is, as shown in FIG. 4, the identification mark 80 is formed on an arc having a diameter that corresponds to a position at which the collar portion 67b of the shifter 67 in the inoperative state is disposed. On the other hand, when the shifter 67 is switched to the operative state, the identification mark 80 can be clearly seen since the shifter 67 is not positioned more inside than the projection 72. For this reason, the state of the shifters 67 may be immediately determined by the appearance of the identification mark 80.

Braking Force Adjustment

When the braking force is adjusted, the opening 5d in the side plate 5a is exposed by opening the first side-cover 6a.

In order to open the first side-cover 6a, the control lever 37b is firstly raised to enter an unlocking state from a locking state shown in FIG. 2. When the control lever 37b is entered to the unlocking state, the locking member 38 is pushed by the control lever 37b and moved to an unlocking position against an urging force of the coil spring 39. When the locking member 38 is moved to the unlocking state, its end portion is disengaged from the recess 33b of the opening 33 and the handle body 37a becomes rotatable.

When the control lever 37b is rotated in this state, the brake case is rotated together with the handle body 37a as shown in FIG. 5 and the engagement between the screw portions 25 and 26 is disengaged to release the engagement between the brake case 65 and the side plate 5a. When the engagement between the brake case 65 and the side plate 5a is disengaged, the brake case 65 is moved outwardly together with the handle body 37a by the coil spring 44.

Simultaneously, the first side-cover 6a supported by the pivoting mechanism 34 is moved in a direction away from the side plate 5a. When the brake case 65 is completely separated from the side surface of the side plate 5a, the first side-cover 6a is separated from the reel unit 1 and pivoted to a releasing position shown in FIG. 4 around an axis of the pivoting mechanism 34 due to the weight itself. Accordingly, the opening 5d is exposed to outside and the identification mark 80 can be confirmed with the naked eye. The state of each of the shifters 67 may be immediately determined by the appearance of the identification mark 80.

The adjustment of the brake element is carried out by moving the shifters 67 in the guide shaft direction to switch them to the operative state or to the inoperative state. After the braking force is adjusted, the first side-cover 6a is closed. At that time, the first side-cover 6a is manually moved to a closing state side and then the brake case 65 is inserted into the opening 5d by pushing the control lever 37b. The control lever 37b is rotated in the reverse direction in a state in which the end portion of the brake case 65 is in contact so that the screw portions 25 and 26 are engaged. Then, the brake case 65 is coupled to the opening 5d. After that, the control lever 37b is pivoted from the unlocking position to the locking position and the locking member is engaged with the recess 33b. In this manner, the first side-cover 6a is maintained in its closing state.

In this embodiment, since the identification mark 80 is provided with the rotor 66, the state of the shifters 67 which is switchable to the two states may be immediately determined. For this reason, the two states of the shifters may be easily determined and the braking force can be quickly adjusted.

Second Embodiment

Figure 6:
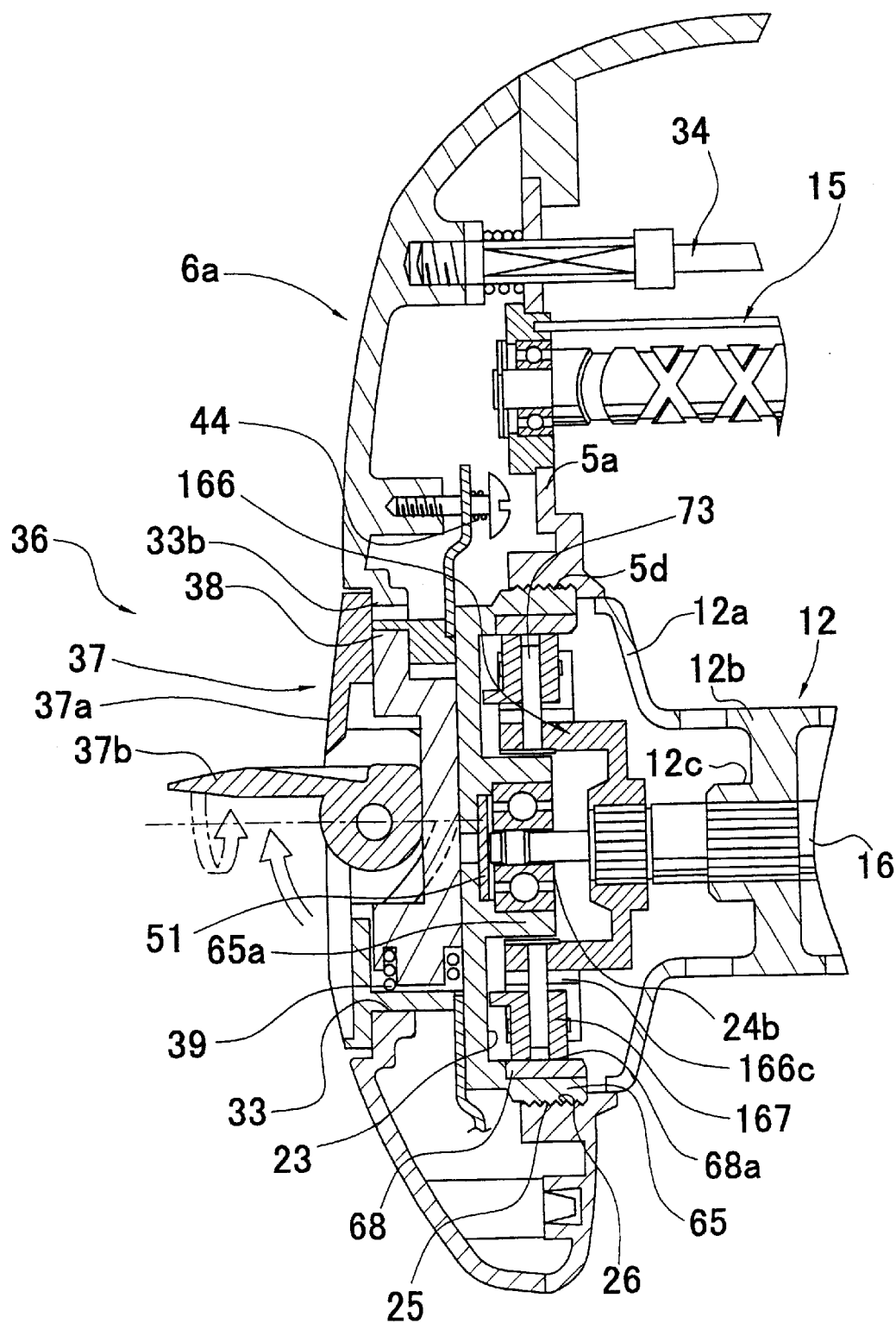
FIG. 6 is a drawing corresponding to FIG. 3 and illustrating a second embodiment.

Although the switching operation to the two states— operative and inoperative—of the shifters 67 is carried out by moving them to different positions in the axial direction of the guide shaft 73 in the first embodiment, the two states may be made switchable according to different rotary positions around the guide shaft 73 as shown in FIG. 6.

Figure 7A:
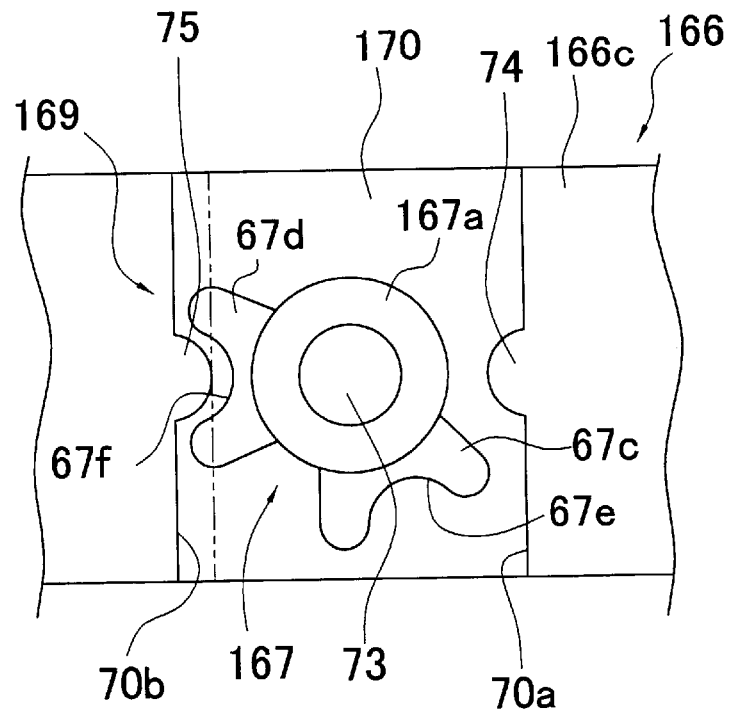
FIGS. 7A and 7B are plan depictions of a shifter in the second embodiment, respectively illustrating switched states of the shifter viewed diametrically endwise in a fragment of a centrifugal braking mechanism rotor.
Figure 7B:
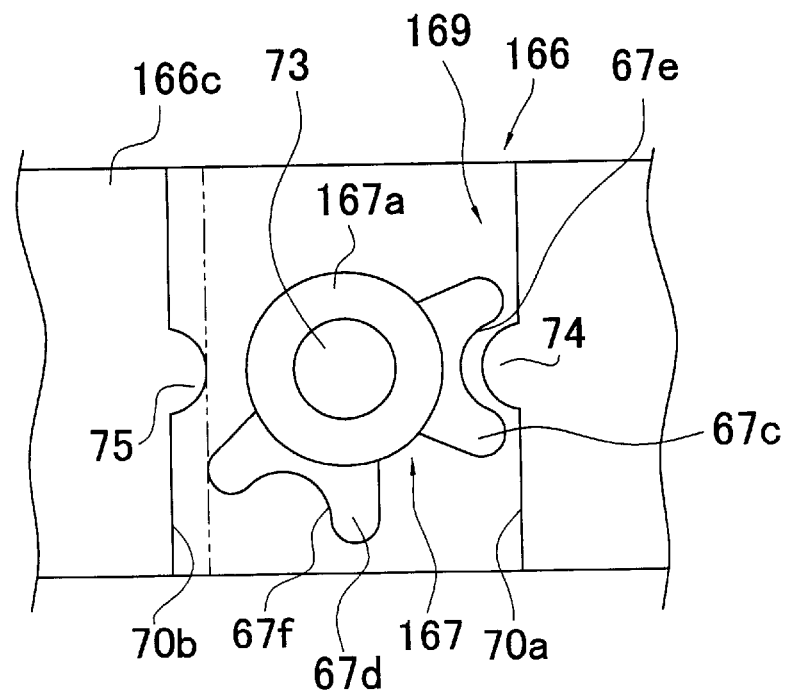

In FIG. 7, a first linear projection 74 and a second linear projection 75 are formed at lateral walls 70a and 70b, respectively, being projected so as to be parallel to the guide shaft 73. The first linear projection 74 is formed from the bottom of the guiding recess 170 to the opening end. The first linear projection 74 is a projection for guiding the shifter 167 to a position at which it may contact with the brake element 68 and maintaining the operative state. The second linear projection 75 is formed from the bottom of the guiding recess 170 with a length just longer than the length by which a second shifter projection 74d to be described later may be engaged. The second linear projection 75 is a projection for restricting the shifters 167 so that they do not make contact with the brake element 68 and maintaining the inoperative state.

Also, the shifter 167 includes a main portion 167a of a cylindrical shape, a first shifter projection 67c, and the second shifter projection 67d. The first shifter projection 67c projects outwardly in the radius direction from a middle portion in the guide shaft direction of the main portion 167a. The second shifter projection 67d projects outwardly in the radius direction from a side end portion inwardly in the guide shaft direction of the main portion 167a. Concave engaging portions 67e and 67f that are engaged with the first and the second linear projections 74 and 75, respectively, are formed on the end of the shifter projections 67c and 67d. The switching mechanism 169 is constituted by the first and the second linear projections 74 and 75 and the first and the second shifter projections 67c and 67d.

The end portion of the shifter projections 67c and 67d including the concave engaging portions 67e and 67f are colored in different hues. For instance, the end portion of the first shifter projection 67c is colored red and that of the second shifter projection 67d is colored blue. By accordingly coloring the end portions, that the shifter 67 is in the operative state when the first side-cover 6a is opened—in the operative state wherein the first shifter projections 67c have been interlocked with the first linear projections 74—may be instantly discerned since the blue-colored end faces of the second shifter projections 67d are oriented reel-outward. Conversely, in the case of the inoperative state, since the red-colored end faces of the first shifter projections 67c are oriented reel-outward, that the shifters 67 are in the inoperative state may be instantly discerned.

Note that the number of the shifter projection may be one. In such case, the state is determined by engaging the shifter projection with which of the two linear projections. The two states may be recognized by, for instance, coloring a circumferential surface of the main portion 67a in two different hues or using different patterns bounded by the shifter projection.

Third Embodiment

Although the shifters are slid in the radius direction of the spool in the previous two embodiments, they may be pivotally attached around an axis in the chord direction of an arc formed by the rotation of the spool.

Figure 8:
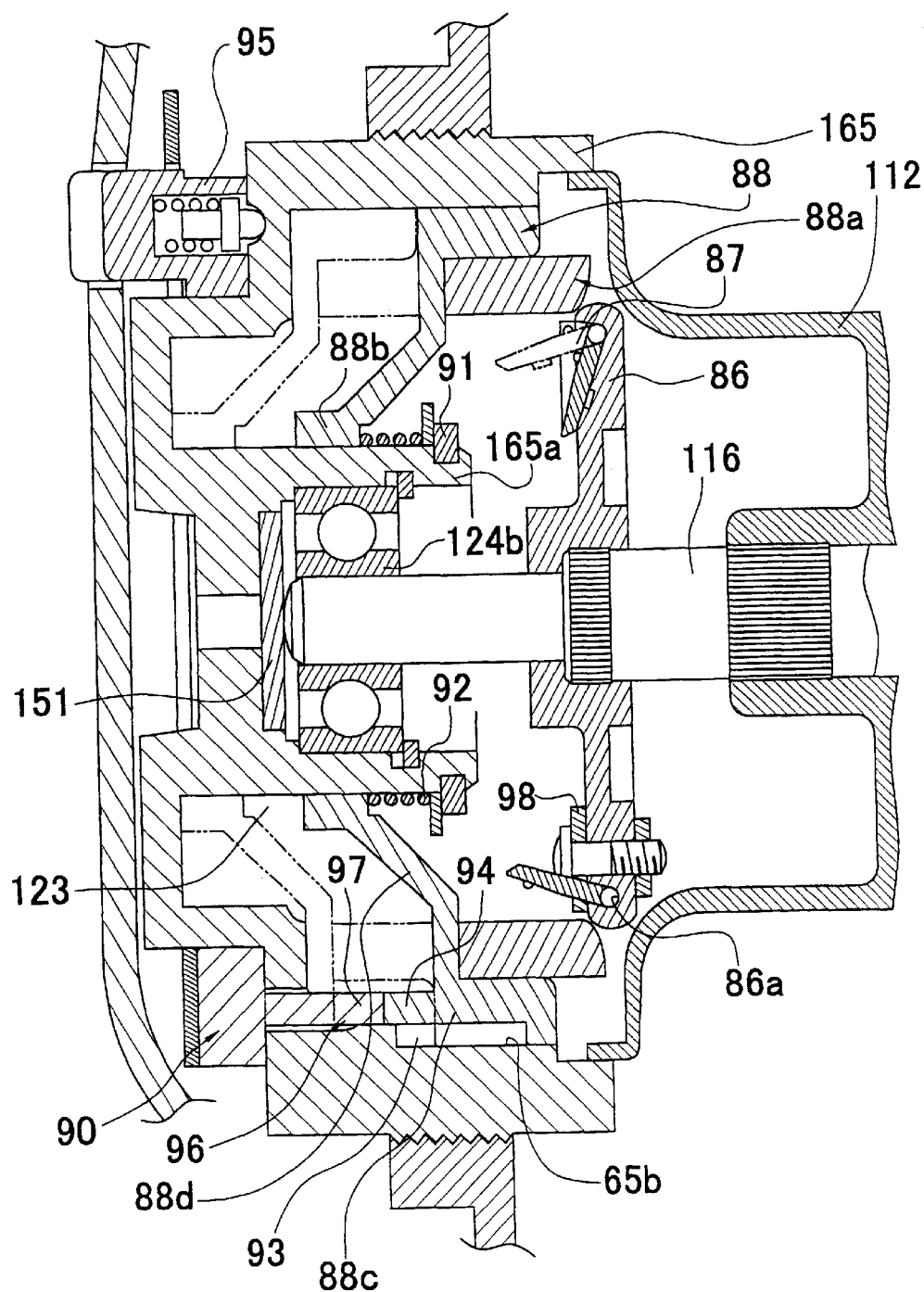
FIG. 8 is a drawing analogous to FIG. 3 and illustrating a third embodiment of the present invention.

As shown in FIG. 8, the centrifugal braking mechanism 123 includes a rotor 86, a brake element 88, shifters 87, and a moving mechanism 90. The rotor 86 is disposed in the brake case 165 and rotates together with the spool 112. The brake element 88 is attached to the brake case 165 in a movable manner in the spool axis direction. The shifters 87, the number of which may be, for instance, six, are pivotally attached to the rotor 86. The moving mechanism 90 is a mechanism for reciprocating the brake element 88 in the spool axis direction.

The brake case 165 is a short cylindrical member having a bottom and includes a bearing accommodating portion 165a. The bearing accommodating portion 165a is a cylindrical shaped member which is disposed at the center of the bottom of the brake case 165 so as to project inwardly. A bearing 124b for supporting the spool shaft 116 is disposed at the bearing accommodating portion 165a and the drag washer 151 of the casting control mechanism in the reel is attached thereto.

A locating snap ring 91 is attached to the outer periphery portion located at the end (right end in FIG. 8) of the bearing accommodating portion 165a. The locating snap ring 91 is engaged with one end of a return spring 92 which forms the moving mechanism 90.

Figure 9:
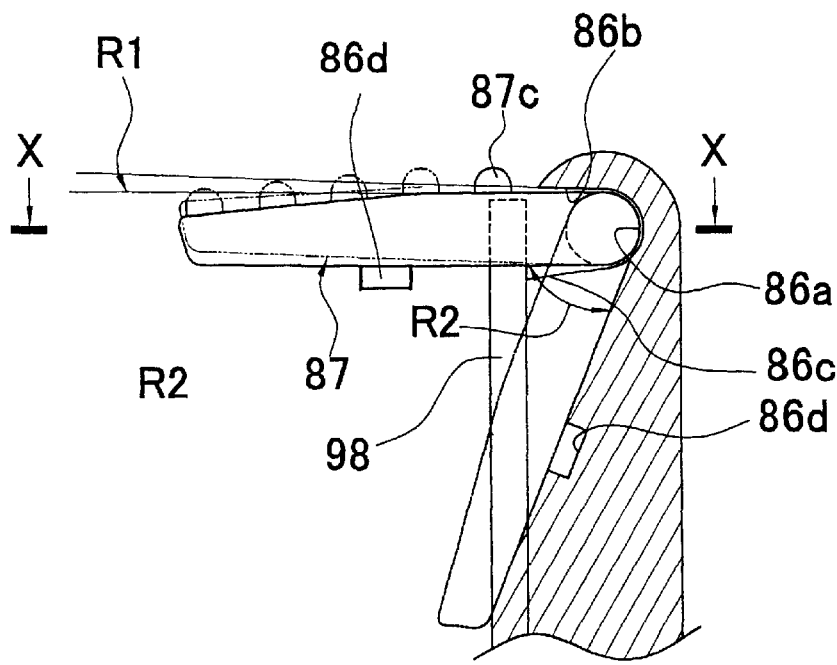
FIG. 9 is a fragmentary view enlarged from FIG. 8 to depict details of a shifter according to the third embodiment.
Figure 10:
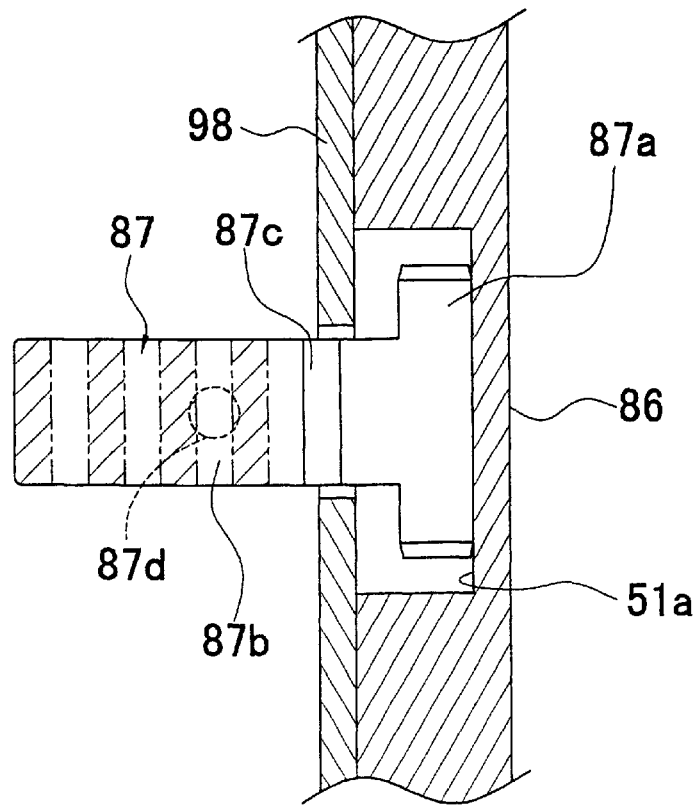
FIG. 10 is a fragmentary sectional view taken along X—X in FIG. 9.

The rotor 86 is a circular plate member non-rotatably coupled to the spool shaft 116 by a serration engagement. Six attachment recesses 86a are formed on the outer periphery surface of the rotor 86 in the chord direction with a space between each other in the circumferential direction. As shown in FIGS. 9 and 10, the attachment recess 86a is a hole having a half-circle bottom area which has a predetermined length in the chord direction. The shifter 87 is pivotally supported by the attachment recess 86a. An engaging plate 98 for engaging the shifter 87 is fixed to an opening surface of the attachment recess 86a of the rotor 86 by screws. As shown in FIG. 9, an inclined surface 86b having angle R1 is formed on an outer peripheral side surface of the attachment recess 86a. Also, an inclined surface 86c having angle R2 is formed on an inner peripheral side surface thereof. The inclined surface 86b on the outer peripheral side and the inclined surface 86c on the inner peripheral side are formed in order to restrict pivotal angle of the shifters 87 and maintain the inoperative state of the shifters 87. The angle R1 may be, for instance, in the range between about 3 to 5 degrees and the angle R2 may be, for instance, in the range between about 75 to 90 degrees. The angle R1 is provided so that the end of the shifter 87 is placed at a position where it may be incorporated to a brake liner 88a (FIG. 8) that is fixed to the inside of the brake element 88. An engagement recess 86d of a circular hole shape is formed in the inclined surface 86c of the angle R2 formed on the inner peripheral side surface. The engagement recess 86d is provided in order to maintain the inoperative state of the shifters 87.

The shifter 87 is pivotally attached to the attachment recess 86a of the rotor 86. As shown in FIGS. 9 and 10, the shifter 87 includes a shaft portion 87a, a pivot portion 87b, a contacting portion 87c, and an engagement projection 874. The shaft portion 87a is attached to the attachment recess 86a. The pivot portion 87b extends outwardly in the spool axis direction from the shaft portion 87a. The contacting portion 87c is formed on the outer surface of the pivot portion 87b so as to project therefrom, The engagement projection 87d is formed on the inside surface of the pivot portion 87b. The outer surface and the inner surface of the shifter 87 are colored in different hues.

Figure 11:
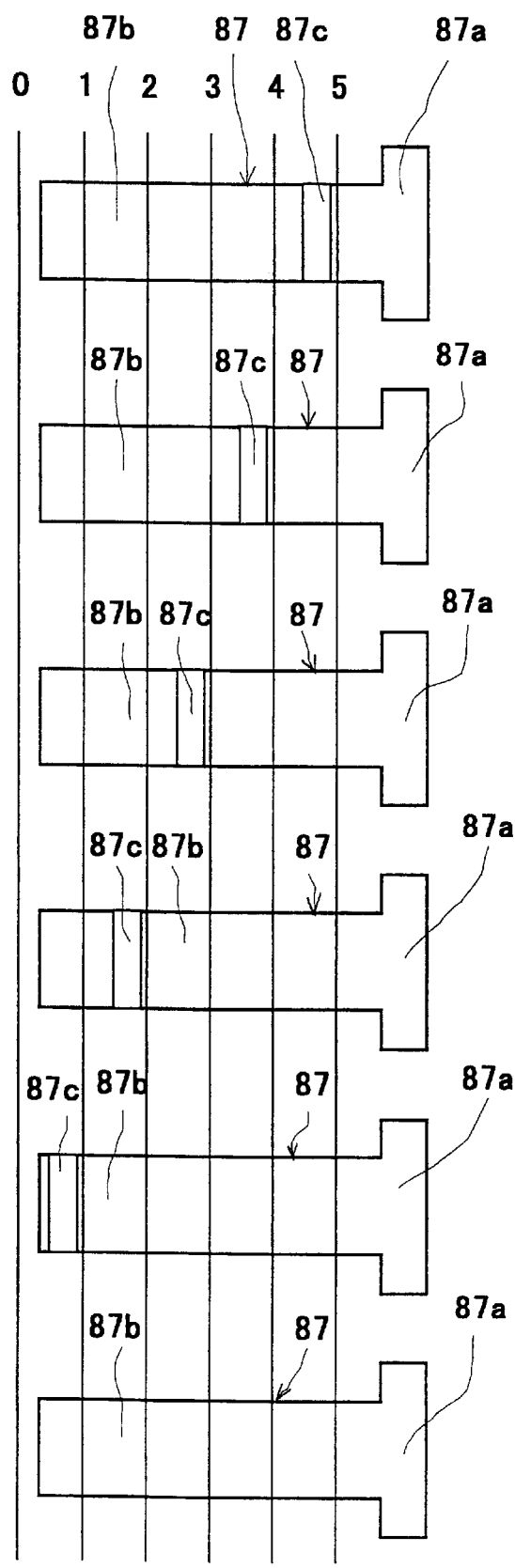
FIG. 11 is a typifying diagram illustrating the number of the shifters that contact a brake liner when braking force is adjusted.

As shown in FIG. 11, positions at which the contacting portions 87c are disposed are differed in the spool axis direction. Also, no contacting portion 87c is provided with one of the six shifters in this embodiment. The shifter 87 that does not have the contacting portion 87c is provided in order to maintain a rotary balance. In addition, the contacting portions 87c are disposed with a substantially equal space between each other. The outer surface of the pivot portion 87b is slightly inclined inwardly. This is to prevent an end of the shifter 87 from sticking out of the brake liner 88a of the brake element 88 when the shifter 87 is pivoted outwardly. The contacting portion 87c makes contact with the brake liner 88a of the brake element 88 to brake the spool 12. The engagement projection 87d is engaged with the engagement recess 86d of the rotor 86. When the engagement projection 87d is engaged with the engagement recess 86d, the shifter 87 is maintained in its inoperative state.

As shown in FIG. 8, the brake element 88 includes an inner periphery portion 88b, an outer periphery portion 88c, and a base 88d. The inner periphery portion 8b is supported by the bearing accommodating portion 65a in a movable manner in the axial direction. The outer periphery portion 88c is non-rotatably attached to the inner periphery surface of the brake case 65 in a movable manner in the axial direction. The base 88d connects the inner periphery portion 88b with the outer periphery portion 88c. The brake liner 88a is fixed to the inner periphery surface of the outer periphery portion 89c. The contacting portions 87c of the shifter 87 make contact with the inner periphery surface of the brake liner 88a. An end portion of the brake liner 88a is tapered so as to expand towards the end. The shifter 87 is smoothly guided to the inner peripheral side of the brake liner 88a by the tapered surface. The other end of the return spring 92 is engaged with the bottom portion of the inner periphery portion 88b. In this manner, the brake element 88 is always urged outwardly in the spool axis direction. A pair of engaging pins 93 which projects in the radius direction is formed on the outer periphery surface of the brake element 88. The pair of the engaging pins 93 is engaged with a pair of engaging grooves 65b which is formed on the inner periphery surface of the brake case 65 in the spool axis direction so that the brake element 88 is non-rotatably attached to the brake case 65. Also, a first cam 94 which projects outwardly in the spool axis direction is disposed at the outer periphery portion 88c of the brake element 88. The first cam 94 is a cam having a substantially triangular shape and forms a part of the moving mechanism 90.

As shown in FIG. 8, the moving mechanism 90 includes a rotary member 95, a cam mechanism 96, and a return spring 92. The rotary member 95 is rotatably attached to the brake case 165. The cam mechanism 96 converts the rotation of the rotary member 95 into a movement in the spool axis direction (a direction approaching to the handle 2). The return spring 92 moves the brake element 88, which has been moved in the above-mentioned direction by the cam mechanism 96, in the other direction (direction away from the handle 2). The rotary member 95 includes a second cam 97 of substantially a triangular shape which makes contact with the first cam 94. The first cam 94 and the second cam 97 constitute the cam mechanism 96.

In the moving mechanism 90, the brake element 88 is moved in a direction approaching to the rotor 86 due to operations of the first cam 94 and the second cam 97 when the rotary member 95 is rotated in one direction. As a result, the number of the shifters 87 which make contact with the brake liner 88a is increased and, hence, the braking force is also increased. On the other hand, when the rotary member 95 is moved in the opposite direction, the brake element 88 is receded in a direction away from the rotary member 66 due to the urging force exerted by the return spring 92. Accordingly, the number of the shifters 87 which make contact with the brake liner 88a is reduced and, hence, the braking force is decreased. When the brake liner 88a is receded to a receding position at which the brake liner 88a is separated from the contacting portions 87c of the shifters 87, the braking force reaches zero. This state is shown in FIG. 11. That is, when the brake liner 88a is placed at an advanced position shown in the most right hand side in FIG. 11, the largest braking force can be obtained since all of the contacting portions 87c make contact with the brake liner 88a. On the other hand, when the brake liner 88a is placed at the receding position shown in the left hand side in FIG. 11, the braking force reaches zero since no shifters 87 make contact with the brake liner 88a. Then in four intermediate positions in the interval, the number shifters that can come into contact with the brake liner 88a varies in stages.

Figure 12:
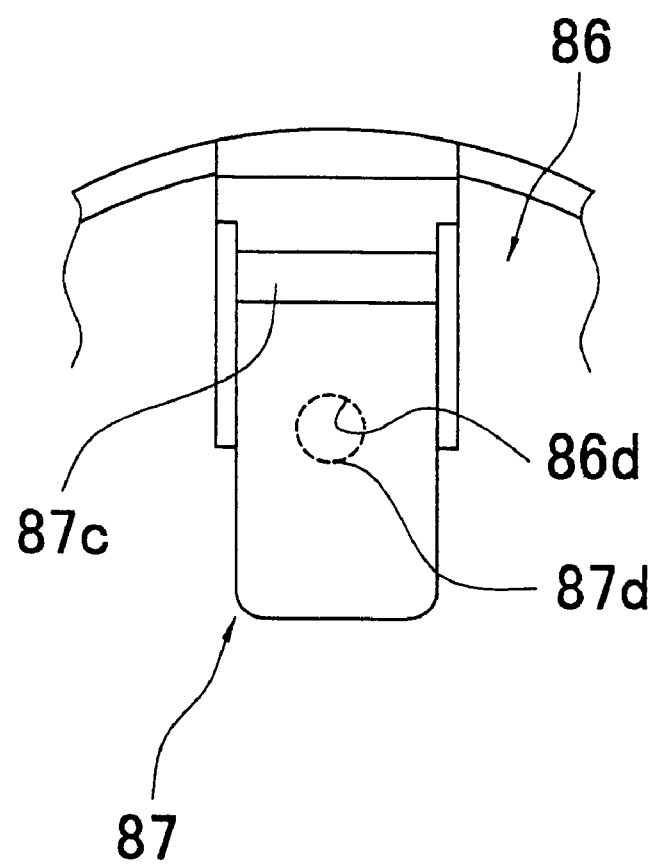
FIG. 12 is a front elevational, fragmentary view corresponding to FIGS. 9 and 10 and depicting a shifter in its inoperative state.

Also, when the shifter 87 is folded towards the rotor 86 side so that the engagement projection 87d is engaged with the engagement recess 86d, the state of the shifter is switched to the inoperative state. At that time, if the first side-cover 6a is opened as shown in FIG. 12, the outside surface of the shifter 87 can be seen from outside of the reel unit 1. Since the outside surface is colored a hue different from the other portions, it can be immediately recognized that the shifter is in the inoperative state.

In the centrifugal braking mechanism 23 having the above-mentioned structure, when a lure is changed to another lure having a different weight, the rotary member 95 is rotated to adjust the braking force in accordance with the weight of the lure. In this embodiment, the braking force due to the centrifugal force may be easily adjusted by simply rotating the rotary member 95 which is exposed to outside. Also, not only a large braking force but also a distinctive difference in the braking force may be obtained when the braking force is adjusted.

Other Embodiments (a) Although the identification mark 80 is provided with the rotary member 66 in the above-mentioned embodiment, the mark 80 may be provided with the spool 12. If the identification mark 80 is provided with the spool 12, the mark 80 may be formed, for instance, on the outside surface of the flange portion 12a which can be seen from outside of the opening 5d.

(b) Although the circular plate wall portion 66d is formed on the rotary member 66 and the identification mark is formed thereon in the above first embodiment, the identification mark may be formed on a side surface of the circular plate portion 66c or the rotary member 66 which can be seen from outside of the reel.

(c) The shape of the identification mark is not limited to an annular shape. For example, a mark which corresponds to only the guiding recess 70 may be formed on the circular plate wall portion or the spool.

(d) The discrimination means is not limited to a identification mark and anything by which the state of the shifters is recognized can be used. For instance, if the degree of the movement of the shifters is large as in the second and the third embodiments, the recognition can be made by the position of the shifters and no coloring is required. The change in the positioning is also included in the discrimination means.

(e) Although the projection of the guiding recess is coupled to the projection of the shifters in any of the above-mentioned embodiments, a structure as disclosed in Japanese Laid-Open Patent Application No. 10-271939 in which projections are disposed so as to be movable in the axial direction or the radius direction of the guide shaft with respect to guiding recess and restrict the movement o the shifters is also applicable to the present invention. In this case, although the switching state may be recognized by a position of the projections, it is possible to use a mark or color to make it more recognizable.

According to the present invention, shifters in their inoperative state and in their operative state may be recognized by a discrimination means. For this reason, the two states of the shifters may be determined easily and a braking force may be adjusted quickly.

While only selected embodiments have been chosen to illustrate the present invention, to those skilled in the art it will be apparent from this disclosure that various changes and modifications can be made herein without departing from the scope of the invention as defined in the appended claims. Furthermore, the foregoing description of the embodiments according to the present invention is provided for illustration only, and not for the purpose of limiting the invention as defined by the appended claims and their equivalents.

What is claimed is:

1. A dual-bearing reel centrifugal braking device for use within a dual-bearing reel unit, the dual-bearing reel unit rotatively carrying a spool on its rotary shaft, said centrifugal braking device being for braking the spool under centrifugal force and comprising:

a brake element attached to the reel unit non-rotatably with respect thereto;

a plurality of shifters provided on the spool for shifting into contact with said brake element and increasing pressure-contact force against said brake element in accordance with an increase in centrifugal force;

switching means for switching selectively and individually any one of said shifters between an inoperative state wherein contact on said brake element is not possible and an operative state wherein contact is possible; and discriminating means for indicating whether each of said shifters is in the inoperative state or in the operative state by distinguishing between said operative state and said inoperative state, said discriminating means being made at least partially invisible during the switching through said switching means when said shifter is switched to one of the inoperative state and the operative state, said discriminating means being made visible during the switching through said switching means when said shifter is switched to the other of the inoperative state and the operative state.

2. A dual-bearing reel centrifugal braking device as set forth in claim 1, further comprising a rotary member coupled with the spool for rotating therewith, wherein said plurality of shifters is provided on the spool via said rotary member.

3. A dual-bearing reel centrifugal braking device as set forth in claim 2, wherein:

said plurality of shifters is fitted radially allowing diametrical shift on said rotary member; and said brake element is a cylindrical component disposed outer-peripheral endwise of said plurality of shifters.

4. A dual-bearing reel centrifugal braking device as set forth in claim 3, wherein said switching means is enabled to switch between the inoperative state and the operative state by translating said shifters into different diametrical positions.

5. A dual-bearing reel centrifugal braking device as set forth in claim 4, wherein said switching means includes:

fixing projections formed on said rotary member and projecting towards said shifters; and shifter projections formed projecting on said shifters, for interlocking with said fixing projections, wherein at least either said fixing projections or said shifter projections are elastically deformable.

6. A dual-bearing reel centrifugal braking device as set forth in claim 5, wherein said fixing projections are formed on said rotary member projecting circumferentially to sandwich said shifters.

7. A dual-bearing reel centrifugal braking device as set forth in claim 5, wherein said rotary member further comprises stop projections arranged in a row diametrically outward of said fixing projections for interlocking with said shifter projections.

8. A dual-bearing reel centrifugal braking device as set forth in claim 3, wherein said switching means is enabled to switch between the inoperative state and the operative state by translating said shifters into different rotational positions about their axes of diametrical shift.

9. A dual-bearing reel centrifugal braking device as set forth in claim 2, wherein said plurality of shifters is fitted to said rotary member for pivoting about a plurality of axes along chord directions in rotational arcs of the spool; and said switching means is enabled to switch between the inoperative state and the operative state by translating said shifters into different pivotal positions about their axes along the chord directions.

10. The centrifugal braking device as set forth in claim 1, wherein the reel unit has a frame and a side cover that can be opened off at least during the switching through said switching means, and said discriminating means is made at least partially invisible when the side cover is opened off the frame and said shifter is switched to one of the inoperative state and the operative state, said discriminating means being visible when the side cover is opened off the frame and said shifter is switched to the other of the inoperative state and the operative state.

11. A dual-bearing reel centrifugal braking device for use within a dual-bearing reel unit rotatively carrying a spool on its rotary shaft, said centrifugal braking device being for braking the spool under centrifugal force and comprising:

a brake element attached to the reel unit non-rotatably with respect thereto;

a plurality of shifters provided on the spool for shifting into contact with said brake element and increasing pressure-contact force against said brake element in accordance with an increase in centrifugal force;

switching means for switching selectively and individually any one of said shifters between an inoperative state wherein contact on said brake element is not possible and an operative state wherein contact is possible;

discriminating means for indicating whether each of said shifters is in the inoperative state or in the operative state by distinguishing between said operative state and said inoperative state; and a rotary member coupled with the spool for rotating therewith, said plurality of shifters being provided on the spool via said rotary member, wherein said plurality of shifters is fitted radially allowing diametrical shift on said rotary member, said brake element is a cylindrical component disposed outer-peripheral endwise of said plurality of shifters, said switching means is enabled to switch between the inoperative state and the operative state by translating said shifters into different diametrical positions, and said discriminating means is an identification mark formed annularly on a lateral face of said rotary member outward of and concentric with the rotary shaft of the spool.

12. A dual-bearing reel centrifugal braking device as set forth in claim 11, wherein said shifter is in the inoperative state when said shifter shields a portion of said identification mark and makes said portion invisible.

13. A dual-bearing reel centrifugal braking device for use within a dual-bearing reel unit rotatively carrying a spool on its rotary shaft, said centrifugal braking device being for braking the spool under centrifugal force and comprising:

a rotary member having a fixing portion to which the rotary shaft of the spool is coupled, a body that extends outward from said fixing portion, and a circular plate portion that projects outward from an outer periphery of said body;

a brake element attached to the reel unit non-rotatably with respect thereto;

a plurality of shifters provided adjacent said circular plate for shifting into contact with said brake element and increasing pressure-contact force against said brake element in accordance with an increase in centrifugal force;

switching means for switching at least any one of said plurality of shifters between an inoperative state wherein contact on said brake element is not possible and an operative state wherein contact is possible; and discriminating means for discriminating between said shifters in the inoperative state and said shifters in the operative state, said discriminating means including an annular mark provided on said circular plate concentric with the rotary shaft of the spool.

14. A dual-bearing reel centrifugal braking device for use within a dual-bearing reel unit, the dual-bearing reel unit rotatively carrying a spool on its rotary shaft, said centrifugal braking device being for braking the spool under centrifugal force and comprising:

a brake element attached to the reel unit non-rotatably with respect thereto;

a plurality of shifters provided on the spool for shifting into contact with said brake element and increasing pressure-contact force against said brake element in accordance with an increase in centrifugal force;

switching means for switching at least any one of said plurality of shifters between an inoperative state wherein contact on said brake element is not possible and an operative state wherein contact is possible; and discriminating means for indicating whether each of said shifters is in the inoperative state or in the operative state, said discriminating means being provided for each of said shifters, said discriminating means being made at least partially invisible during the switching through said switching means when said shifter is switched to one of the inoperative state and the operative state, said discriminating means being made visible during the switching through said switching means when the said shifter is switched to the other of the inoperative state and the operative state.

15. The centrifugal braking device as set forth in claim 14, further comprising a rotary member coupled with the spool for rotating therewith and having shafts to which said shifters are coupled, said switching means switching said shifters between the inoperative state and the operative state by rotating said shifters around said shafts.

16. The centrifugal braking device as set forth in claim 15, wherein said rotary member includes linear shafts, and said shifters include engaging portions that can engage said linear shafts.

17. The centrifugal braking device as set forth in claim 14, further comprising a rotary member coupled with the spool for rotating therewith and having attachment portions to which said shifters are pivotally attached, and said switching means switching said shifters between the inoperative state and the operative state by causing said shifters to pivot relative to said attachment portions.

18. The centrifugal braking device as set forth in claim 17, wherein said rotary member includes first engagement portions, and said shifters include second engagement portions that can engage said first engagement portions such that the inoperative state of said shifter is achieved.

19. The centrifugal braking device as set forth in claim 14, wherein the reel unit has a frame and a side cover that can be opened off at least during the switching through said switching means, and said discriminating means is made at least partially invisible when the side cover is opened off the frame and said shifter is switched to one of the inoperative state and the operative state, said discriminating means being visible when the side cover is opened off the frame and said shifter is switched to the other of the inoperative state and the operative state.

20. The centrifugal braking device for use within a dual-bearing reel unit rotatively carrying a spool on its rotary shaft, said centrifugal braking device being for braking the spool under centrifugal force and comprising:

a brake element attached to the reel unit non-rotatably with respect thereto;

a plurality of shifters provided on the spool for shifting into contact with said brake element and increasing pressure-contact force against said brake element in accordance with an increase in centrifugal force;

switching means for switching at least any one of said plurality of shifters between an inoperative state wherein contact on said brake element is not possible and an operative state wherein contact is possible;

discriminating means for indicating whether each of said shifters is in the inoperative state or in the operative state, said discriminating means being provided for each of said shifters; and a rotary member coupled with the spool for rotating therewith and having shafts to which said shifters are coupled, wherein
said switching means switches said shifters between the inoperative state and the operative state by rotating said shifters around said shafts,
said rotary member includes linear shafts,
said shifters include engaging portions that can engage said linear shafts, and
each of said engaging portions is colored in different hues.

21. The centrifugal braking device for use within a dual-bearing reel unit rotatively carrying a spool on its rotary shaft, said centrifugal braking device being for braking the spool under centrifugal force and comprising:

a brake element attached to the reel unit non-rotatably with respect thereto;

a plurality of shifters provided on the spool for shifting into contact with said brake element and increasing pressure-contact force against said brake element in accordance with an increase in centrifugal force;

switching means for switching at least any one of said plurality of shifters between an inoperative state wherein contact on said brake element is not possible and an operative state wherein contact is possible;

discriminating means for indicating whether each of said shifters is in the inoperative state or in the operative state, said discriminating means being provided for each of said shifters; and a rotary member coupled with the spool for rotating therewith and having attachment portions to which said shifters are pivotally attached; wherein
said switching means switches said shifters between the inoperative state and the operative state by causing said shifters to pivot relative to said attachment portions,
said rotary member includes first engagement portions,
said shifters include second engagement portions that can engage said first engagement portions such that the inoperative state of said shifter is achieved, and
each of said shifters has an inner surface and an outer surface, said second engagement portion being provided on said inner surface, said inner surface and outer surface being colored in different hues.

* * * * *